(12) United States Patent
Svore et al.

(10) Patent No.: US 7,747,600 B2
(45) Date of Patent: Jun. 29, 2010

(54) MULTI-LEVEL SEARCH

(75) Inventors: Krysta Svore, Seattle, WA (US); Chris Burges, Bellevue, WA (US); Silviu-Petru Cucerzan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 11/818,088

(22) Filed: Jun. 13, 2007

(65) Prior Publication Data

US 2008/0313147 A1    Dec. 18, 2008

(51) Int. Cl.
*G06F 17/30* (2006.01)
(52) U.S. Cl. .................. 707/706; 707/707; 707/708; 707/709; 707/710
(58) Field of Classification Search .................. 707/3–7, 707/10
See application file for complete search history.

(56) References Cited

U.S. PATENT DOCUMENTS

| | | | |
|---|---|---|---|
| 6,772,139 B1 * | 8/2004 | Smith, III ...................... | 707/3 |
| 6,978,264 B2 | 12/2005 | Chandrasekar et al. ......... | 707/3 |
| 7,107,263 B2 | 9/2006 | Yianilos et al. ................. | 707/3 |
| 7,110,996 B2 | 9/2006 | Kawamura ..................... | 707/3 |
| 7,165,119 B2 | 1/2007 | Fish ........................... | 709/246 |
| 7,181,438 B1 * | 2/2007 | Szabo .......................... | 707/2 |
| 7,437,353 B2 * | 10/2008 | Marmaros et al. .............. | 707/5 |
| 2005/0278164 A1 * | 12/2005 | Hudson et al. ................. | 704/4 |
| 2006/0004732 A1 * | 1/2006 | Odom .......................... | 707/3 |
| 2007/0083505 A1 * | 4/2007 | Ferrari et al. ................. | 707/5 |
| 2007/0136251 A1 * | 6/2007 | Colledge et al. ............... | 707/3 |
| 2008/0133482 A1 * | 6/2008 | Anick et al. ................... | 707/3 |
| 2009/0055354 A1 * | 2/2009 | Arad ............................ | 707/3 |

* cited by examiner

*Primary Examiner*—Don Wong
*Assistant Examiner*—Hanh B Thai
(74) *Attorney, Agent, or Firm*—Westman, Champlin & Kelly, P.A.; Alan Rego (57) ABSTRACT

A computer-implementable method and system for performing a multi-level search. The method includes performing a primary search that involves executing a query submitted by a user, and returning primary search results (a list of documents, for example). The method further includes automatically performing a secondary search. The secondary search involves identifying at least one third-party source of information based on the query, and automatically assessing a semantic interpretation of the query. The secondary search utilizes the identified at least one third-party source of information and the semantic interpretation of the query to derive secondary search results, which are displayed along with the primary search results.

14 Claims, 7 Drawing Sheets

MULTI-LEVEL SEARCH

BACKGROUND

A typical search engine searches documents for specified keywords and returns a list of documents where the keywords were found. Thus, such search engines are essentially limited in functionality to helping users locate documents of interest.

The discussion above is merely provided for general background information and is not intended to be used as an aid in determining the scope of the claimed subject matter.

SUMMARY

A computer-implementable method and system for performing a multi-level search is provided. The method includes performing a primary search that involves executing a query submitted by a user, and returning primary search results (a list of documents, for example). The method further includes automatically performing a secondary search. The secondary search involves identifying at least one third-party source of information based on the query, and automatically assessing a semantic interpretation of the query. The secondary search utilizes the identified at least one third-party source of information and the semantic interpretation of the query to derive secondary search results, which are displayed along with the primary search results. In some embodiments, information/results obtained from the secondary search are used to alter the primary search results (for example, to help rank documents obtained as a result of carrying out the primary search).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
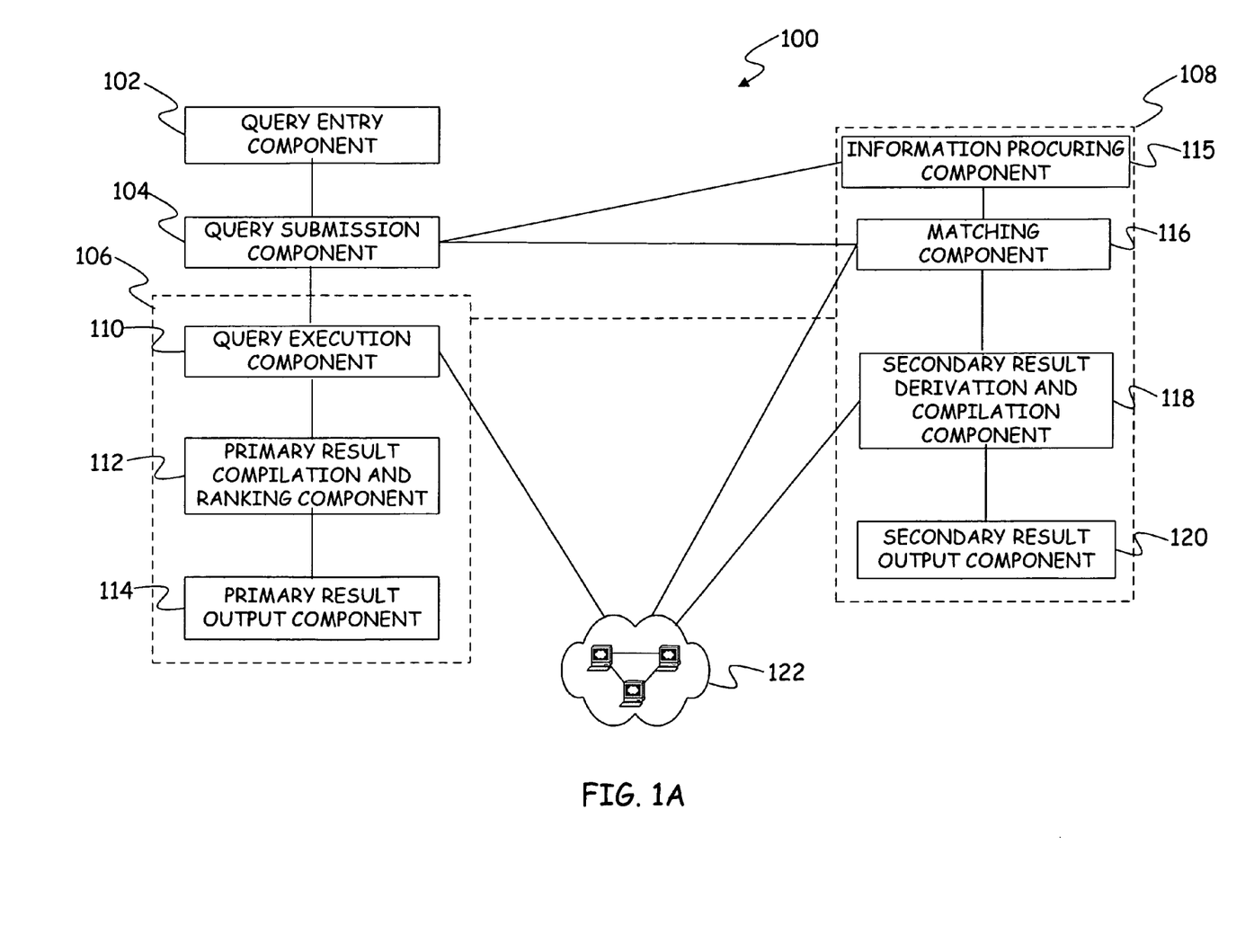
FIG. 1A is a simplified block diagram that illustrates various components of a search engine in accordance with one of the present embodiments.

FIG. 1A is a simplified block diagram that illustrates various components of a search engine 100 in accordance with one of the present embodiments. Search engine 100 includes a query entry component 102 (for example, a query entry field on a search page) a query submission component 104 and several query implementation components that are collectively capable of carrying out a multi-level search based on an input query string. The query implementation components include primary search components 106 and secondary search components 108. Primary search components 106 include a query execution component 110, a primary result compilation and ranking component 112 and a primary result output component 114. Secondary search components 108 include an information procuring component 115, a matching component 116, a secondary result derivation and compilation component 118 and a secondary result output component 120.

In the example embodiment of FIG. 1, a user can enter one or more keywords (referred to herein as a query string) in query entry component 102. Execution of the entered query is initiated by query submission component 104. Component 104 can include a button, that is configured to receive a query initiation command (such as a mouse click) from a user, and suitable code linked to the button, which can, upon receipt of the command by the button, responsively submit the query for processing by the query implementation components.

Query execution component 110 is configured to search documents, for example, on the World Wide Web or other network 122, for keywords included in the query string. Thus, upon receipt of a submitted query, component 110, with the help of primary result compilation and ranking component 112 and primary result display component 114, provides a user with a list of documents where the keywords included in the query string were found. The list of documents can be ranked based on frequency of the keywords in the documents, for example. In accordance with the present embodiments, either in conjunction with, or substantially immediately after completion of, the primary search, a secondary search is carried out.

As noted above, secondary search components 108 include information procuring component 115, matching component 116, secondary result derivation and compilation component 118 and secondary result output component 120. Information procuring component 115 is capable of identifying and retrieving one or more third-party sources of information based on the query. The use of third-party sources of information in the secondary search is discussed in detail further below. Matching component 116 can comprise an algorithm that is capable of assessing a semantic interpretation of the query (i.e., identifying which meanings of the query the user may be interested in). To assess a semantic interpretation of the query, in one embodiment, the matching algorithm segments the query string into multiple terms and determines the relationship between the multiple terms. The operation of the matching algorithm is described further below with the help of an example query string. Secondary result derivation and compilation component 118 is configured to utilize the identified third-party sources of information and the semantic interpretation of the query to derive secondary search results and provide the secondary search results to the user via a secondary result output component 120. In some embodiments, information/results obtained from the secondary search are used to alter the primary search results (for example, to help rank documents obtained as a result of carrying out the primary search).

In general, in order to obtain secondary search results, secondary search components 108 can utilize several sources of information. Some useful sources of information are discussed below in connection with FIG. 1B.

Figure 1B:
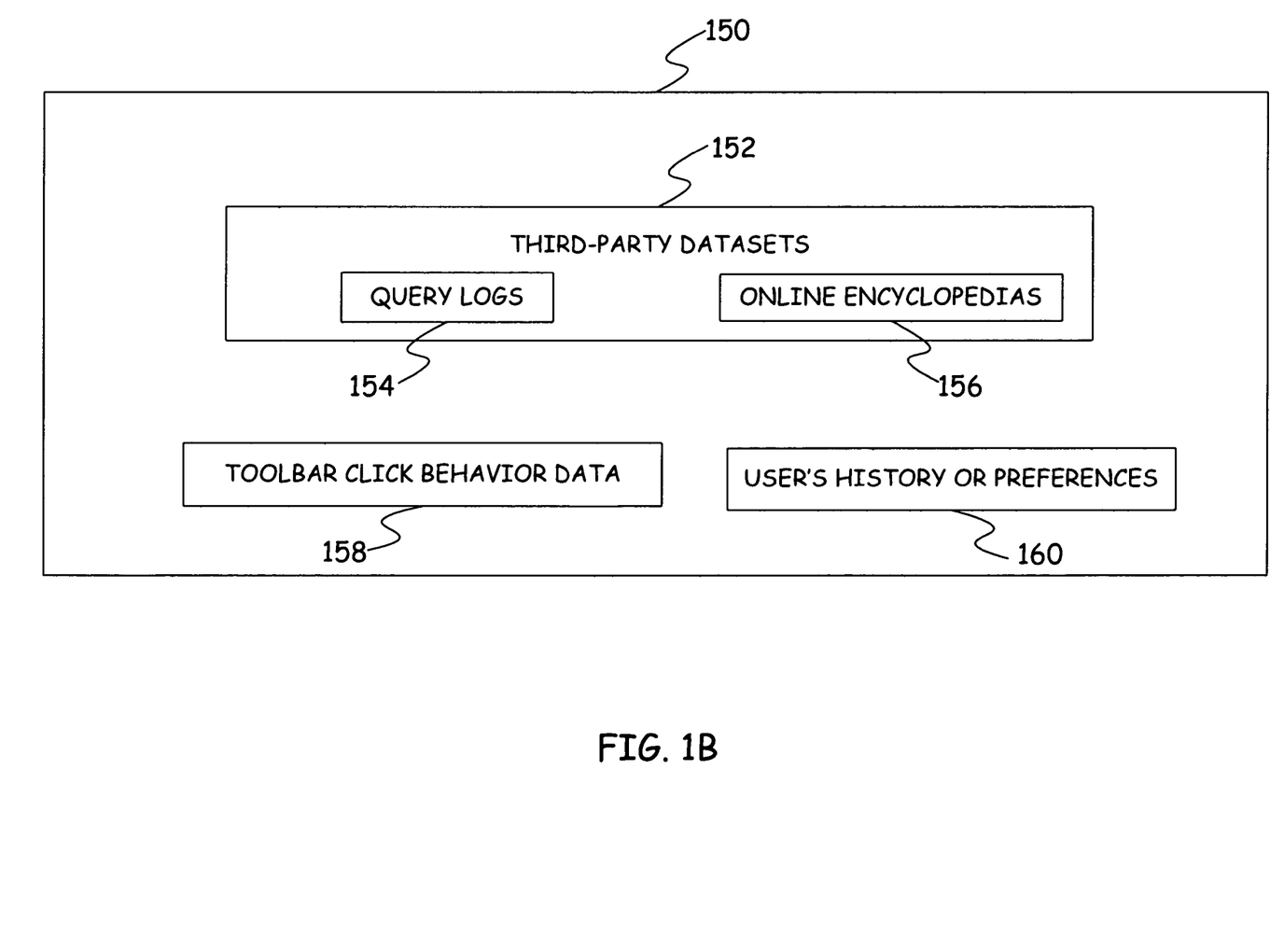
FIG. 1B is a simplified block diagram that illustrates examples of different sources of information that the search engine of FIG. 1A utilizes to derive secondary search results.

FIG. 1B is a simplified block diagram that illustrates examples of different sources of information (collectively denoted by reference numeral 150) that the search engine 100 of FIG. 1A can utilize to derive and present secondary search results. As can be seen in FIG. 1B, the sources include third-party datasets 152 (such as query logs 154, online encyclopedias 156, etc.), toolbar click behavior data 158, user's history or preferences 160, etc.

Figure 1C:
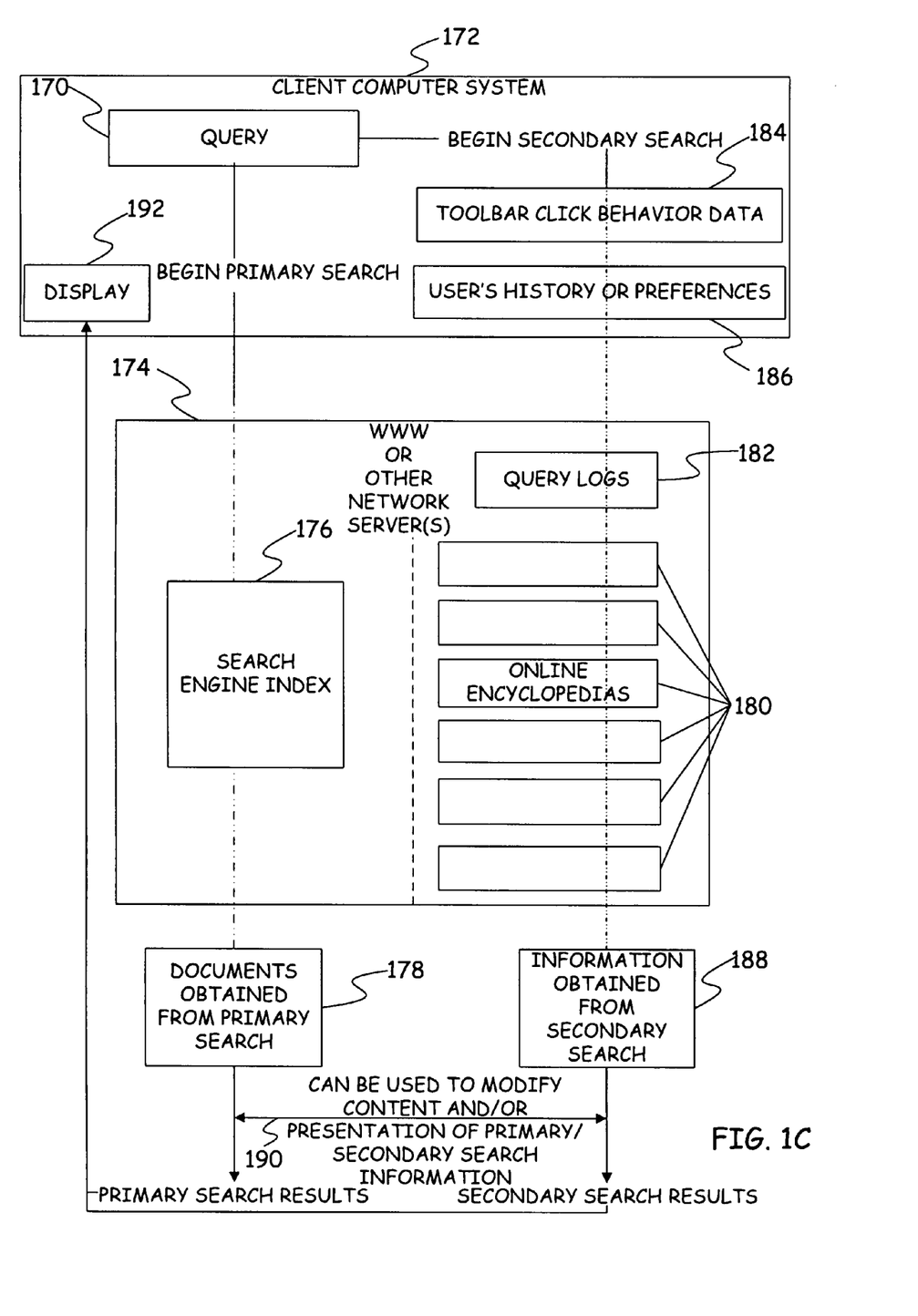
FIG. 1C is a simplified block diagram that illustrates an example of how primary and secondary search results are obtained.

FIG. 1C is a simplified block diagram showing an example of how primary and secondary search results are obtained in accordance with one embodiment. As can be seen in FIG. 1C, for a query 170 issued from a client computer system 172, a primary search involves carrying out a keyword search, on server(s) 174, in a conventional manner using a search engine index 176 of numerous web pages, to obtain a plurality of documents 178, for example. In contrast, the secondary search involves mining information from websites 180, which can include online encyclopedias and other useful third-party sources, and utilizing query logs 182, toolbar click behavior data 184, a user's history or preferences 186, etc., to generate content relevant to the query 170 or any questions related to the query 170. In FIG. 1C, information obtained from the secondary search is denoted by reference numeral 188. As indicated by double-arrow line 190, information obtained from the secondary search can be used to alter primary search results, and vice versa. Primary and secondary search results are provided to the user via display unit 192 of client computer system 172.

In essence, the present embodiments, enhance a user's search experience by discovering useful sources of information among third-party sources or query logs or content of returned primary search results and automatically generating content relevant to the user's intent. More specifically, these embodiments present information to a search engine user by leveraging third-party sources or query logs or the query string or returned search results or both/all and extracting content relevant to the query or any question related to the query. The extracted content is aggregated into a summary or list for quick understanding and quick access to a specific aspect of the query the user is interested in. Thus, in the present embodiments, third-party data is used to directly meet the user's needs, by anticipating the question(s) the user is trying to answer and displaying different possible answers, in addition to the primary search results, in the form of external links, summaries, and additional displayed content. It should be noted that, in the present embodiments, summary content is dynamically created (in real-time), based on the query, returned primary search results, and third-party data, such that the summaries have high likelihood of more directly addressing the user's needs. Details and examples regarding how secondary search results are derived in various embodiments are described below.

Different embodiments can utilize one or more different techniques to determine and display relevant content. In one embodiment, third-party content is used to determine the most important phrases or sentences within returned primary search results or among third-party sources or both to produce a summary. Third-party content, in one embodiment, is arranged based on popularity of displayed links via Toolbar click behavior data. In one embodiment, displayed content is also personalized based on a user's history or preferences. Displayed content, in another embodiment, can be a link to a disambiguation page, which contains an ordered list of third-party information based on a user's history. For example, if the user issued the same query previously and chose the third item (for example, Texas the band instead of Texas the state) on the disambiguation list, then that item will be repositioned to the top of the list in the future. Items can also be repositioned based on popularity, as measured by Toolbar data. For example, pages of a particular online encyclopedia (hereinafter referred to as online encyclopedia X) can be positioned in the disambiguation list based on the frequency of user clicks. In one embodiment, content can also be temporally displayed, so that more recently updated third-party content is positioned higher than older content. In another embodiment, third-party content from multiple sources, including for example returned primary search results, pages of online encyclopedia X, and popular sites, are summarized and displayed on the search results page. For example, if a user issues the query "middle east conflict" and there is a paragraph on Pope Benedict's page of online encyclopedia X with that title, then a phrase within the summary titled "Pope Benedict XVI and the Middle East Conflict," which links the user to the section of Pope Benedict's page of online encyclopedia X entitled "Middle East Conflict," can be displayed. In one embodiment, only highly "trustworthy" pages are shown. For example, for online encyclopedia X, only those pages that not everyone can edit are shown. User behavior can be leveraged further to display links typically followed by a user beyond just the first click. For example, if a user clicks on a displayed online encyclopedia X page and typically also clicks on another online encyclopedia X page from the original online encyclopedia X page, both pages or a snippet that summarizes the two pages are displayed. In one embodiment, the query is segmented and third-party content related to the segments of the query string are displayed. Alternatively, content can be displayed based on related queries. For example, a user searching for news on company A's portable media player may be interested in online encyclopedia X's page for company A or related products. By using online encyclopedia X's category information, for example, the portable media player with company A and an article about company A from online encyclopedia X is displayed. In addition, a link to disambiguated third-party information determined by the search result page title and snippet can be displayed in a bubble when hovering over each primary search result.

In one specific embodiment, a news search page is provided. For purposes of illustration of this embodiment, consider online encyclopedia X and news query logs as the third-party sources. A user arrives at the news search page and types in "seattle storm." The primary search results portion of the news search result page displays a list of ranked articles relevant to the user's query, but the user wants to know about the recent Seattle storm and not the women's basketball team Seattle Storm.

The specific embodiment finds the named entities within the returned search results and also finds all named entities in online encyclopedia X. Using query logs and user-behavior information, the named entities found in online encyclopedia X are ranked according to frequency (interest determined by click behavior and/or query logs). When generating the summary or highlight of the query topic among search results and third-party sources, these frequent entities receive a higher weight. That is, there is a bias toward entities or terms that are ranked higher among query logs. The summary is then automatically "focused" on terms that are popular and relevant to the query topic. Phrases and content is chosen which has a higher weight on popular terms, making the summary more relevant to the user's intent.

The user also wants to know about the current road closures, the extent of the power outage, the weather forecast, the affects of the last big storm in Seattle, photos of the affected areas, etc. A matching algorithm (contained in a matching component such as 116 of FIG. 1A) first segments the query into two terms: "Seattle" and "storm." A relationship between "Seattle" and "storm" is then determined based on the returned search results or query logs or online encyclopedia X or both/all. In this case, query logs and click behavior can help determine that the current weather storm is more important than the basketball team. The matching algorithm matches the online encyclopedia X page with title "Seattle" to the query term "Seattle." However, there is the team Seattle Storm, and therefore a link to the Seattle Storm basketball team is shown if the user click frequency measured by toolbar data or according to the frequency of each term appearing among returned results is above a predetermined threshold. If all returned articles are about the weather storm, then no link will be displayed for the basketball team. However, if two articles are about the team, then there could also be a link to the team website, for example.

As the user scrolls over each news article title, the disambiguation occurs automatically based on the title and snippet information. For example, there may have been a recent Storm basketball game, as well as the recent weather storm. When scrolling over the titles, the user sees a link to Seattle Storm (the team) when the article is related to the basketball game and Seattle (the city) when the article is related to the recent weather storm. When scrolling over Seattle (the city) the user also can retrieve other relevant information, such as links to the local power company, the traffic website, or carbon monoxide poisoning, for example. The user clicks on Seattle (the city) and learns immediately about the current storm damage, etc.

Adjacent to the primary search results, there is an automatically generated summary of the recent weather storm in Seattle and the resulting damage as well as a brief summary of the basketball game (as long as at least one article was about the game). The popularity of named entities in online encyclopedia X, determined by click behavior and query log frequency, are used to determine which phrases or sentences among returned articles and third-party sources have the most important content relevant to the user's intent. Phrases with higher ranked terms receive a heavier weight and are thus preferred in the sentence choosing process. The articles are scanned and the most important and novel sentences are extracted and combined into a bulleted summary also displayed on the search results page. When the user clicks on any sentence in the summary, he/she is taken to the article which contained that sentence. If the user had actually been interested in just the basketball game, he/she can click on the sentence in the summary that reports the game results and be taken to the article about the game. If the user was interested in just how power is affected by the storm, he/she can click on the sentence discussing the power outages in the area without reading every title and snippet in the search results. Related external links, such as a link to the Red Cross, a link to the traffic center, a link to the power companies, and other popular links related to the query and user click behavior are also gathered based on search results content or query logs or third-party sources and displayed adjacent to the primary search results. An example user interface that is capable of providing a user with at least some of the above described search results is shown in FIG. 2A.

Figure 2A:
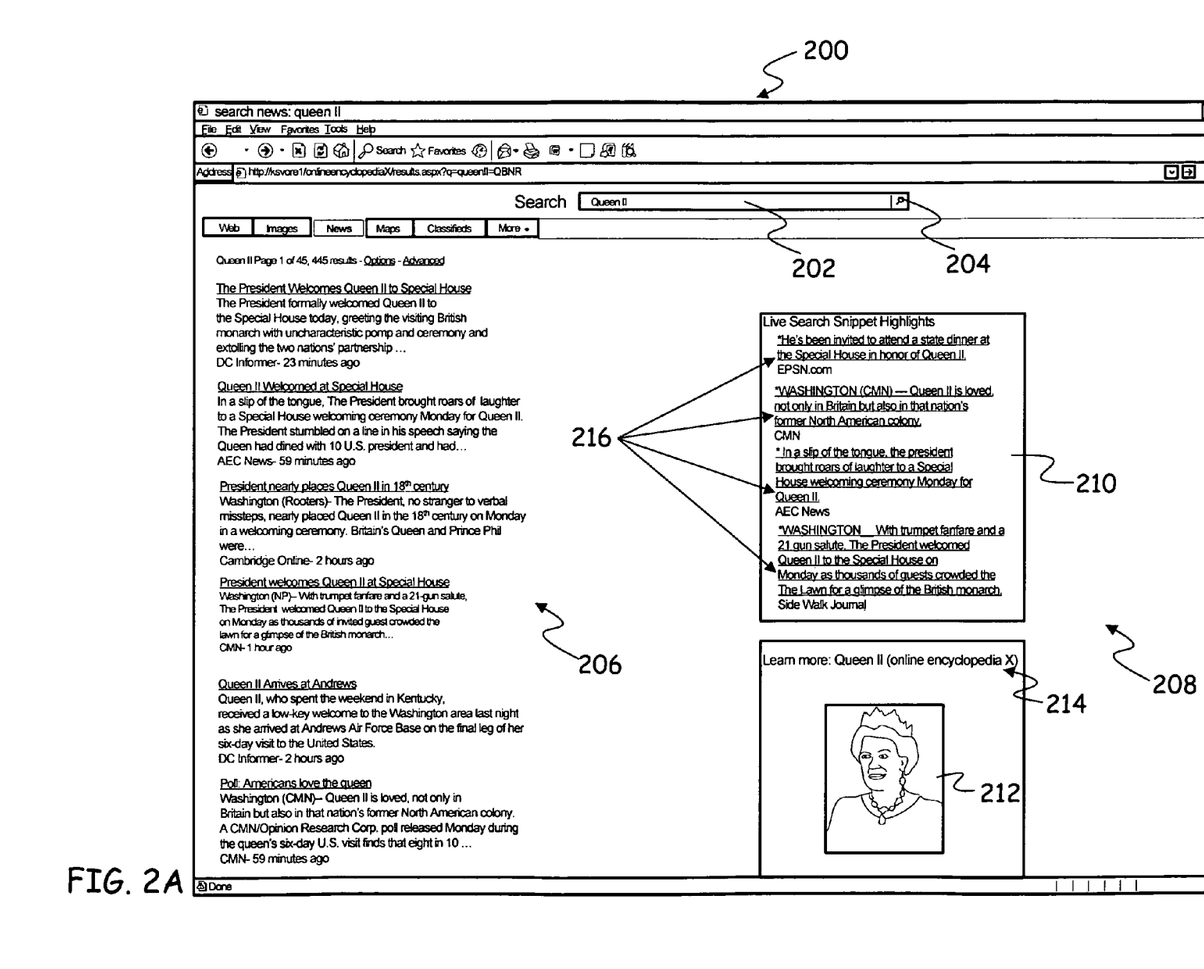
FIG. 2A is a simplified block diagram of a search engine user interface showing example primary and secondary search results in accordance with one of the present embodiments.

As can be seen in FIG. 2A, user interface 200 includes a query entry field 202 and a query submission button 204. Results obtained upon submission of the query are displayed in two sections on user interface 200. A first section 206 displays primary search results, which, as noted above, include a list of documents where the keyword(s) included in the query (Queen II, in the example of FIG. 2A) are found. A second section 208, which displays secondary search results, provides search snippet highlights 210, a picture 212 of Queen II from online encyclopedia X and a link 214 to a page, in online encyclopedia X, which includes additional information about Queen II. By clicking on any of highlighted/underlined sentences 216, in snippet highlights 210, the user can view an entire article that includes the respective highlighted sentence that was clicked on.

Figure 2B:
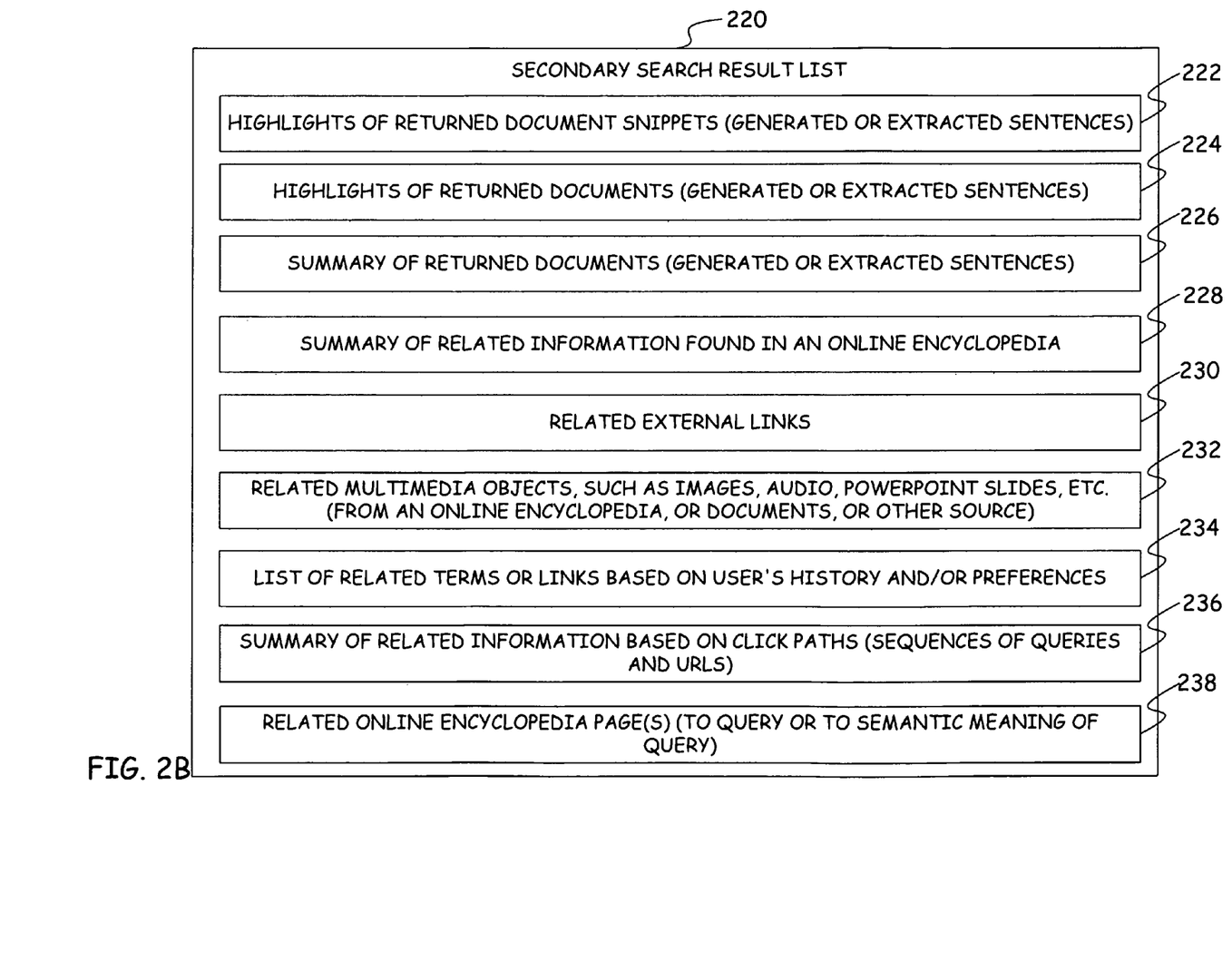
FIG. 2B is a simplified block diagram showing an example list of secondary search result items that the present embodiments are capable of providing.

FIG. 2B is a simplified block diagram showing an example list 220 of secondary search result items that at least some of the present embodiments are capable of providing. It should be noted that the items (222, 224, 226, 228, 230, 232, 234, 236 and 238) in secondary search result list 220 have an and/or relationship (i.e., individual items may or may not be included in the search results for a particular embodiment). Further, the items shown in FIG. 2B are not an exhaustive list of secondary search result items that the present embodiments are capable of providing. In FIG. 2B, "returned documents," which appears in multiple listed items, are documents returned by carrying out a primary search.

In summary, the present embodiments are capable of matching a query string to third-party data, and generating and displaying third-party data which directly addresses a user's needs on a search results page. Third-party data is also leveraged to determine relevant content within the returned search results and within "popular" sites based on query logs and then machine learning techniques are used to combine the relevant content into a summary.

Figure 3:
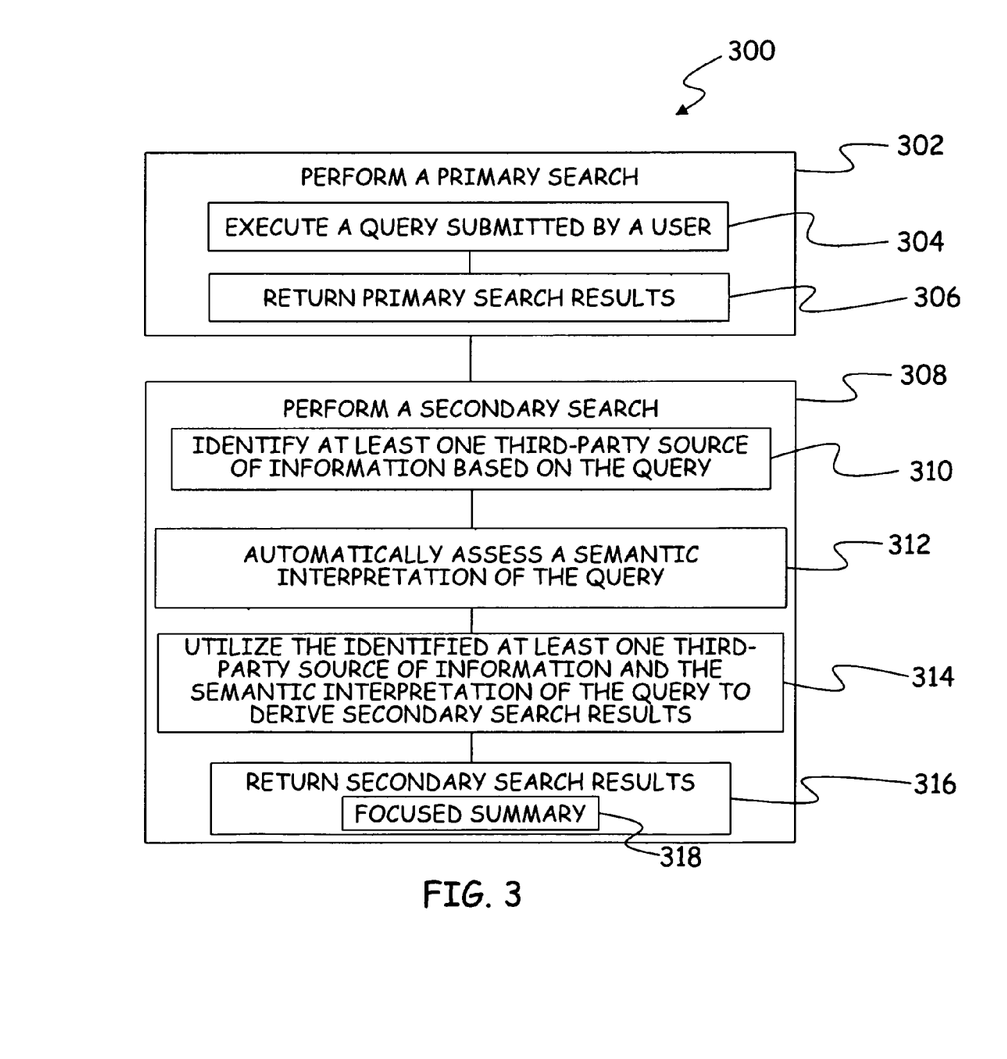
FIG. 3 is a simplified block diagram of a multi-level search method in accordance with one of the present embodiments.

In conclusion, referring now to FIG. 3, a simplified flow diagram 300 of a multi-level search method in accordance with one of the present embodiments is provided. A first step 302 in the method of FIG. 3 involves performing a primary search. Performing the primary search involves executing a query submitted by a user (step 304), and returning primary search results (step 306). Substantially contemporaneously, a secondary search is automatically performed at step 308. The secondary search involves identifying at least one third-party source of information based on the query (step 310), and automatically assessing a semantic interpretation of the query (step 312). The secondary search utilizes the identified at least one third-party source of information and the semantic interpretation of the query to derive secondary search results (step 314), which are displayed along with the primary search results (step 316). In one embodiment, the secondary search results include a focused summary 318 of the primary search results.

Figure 4:
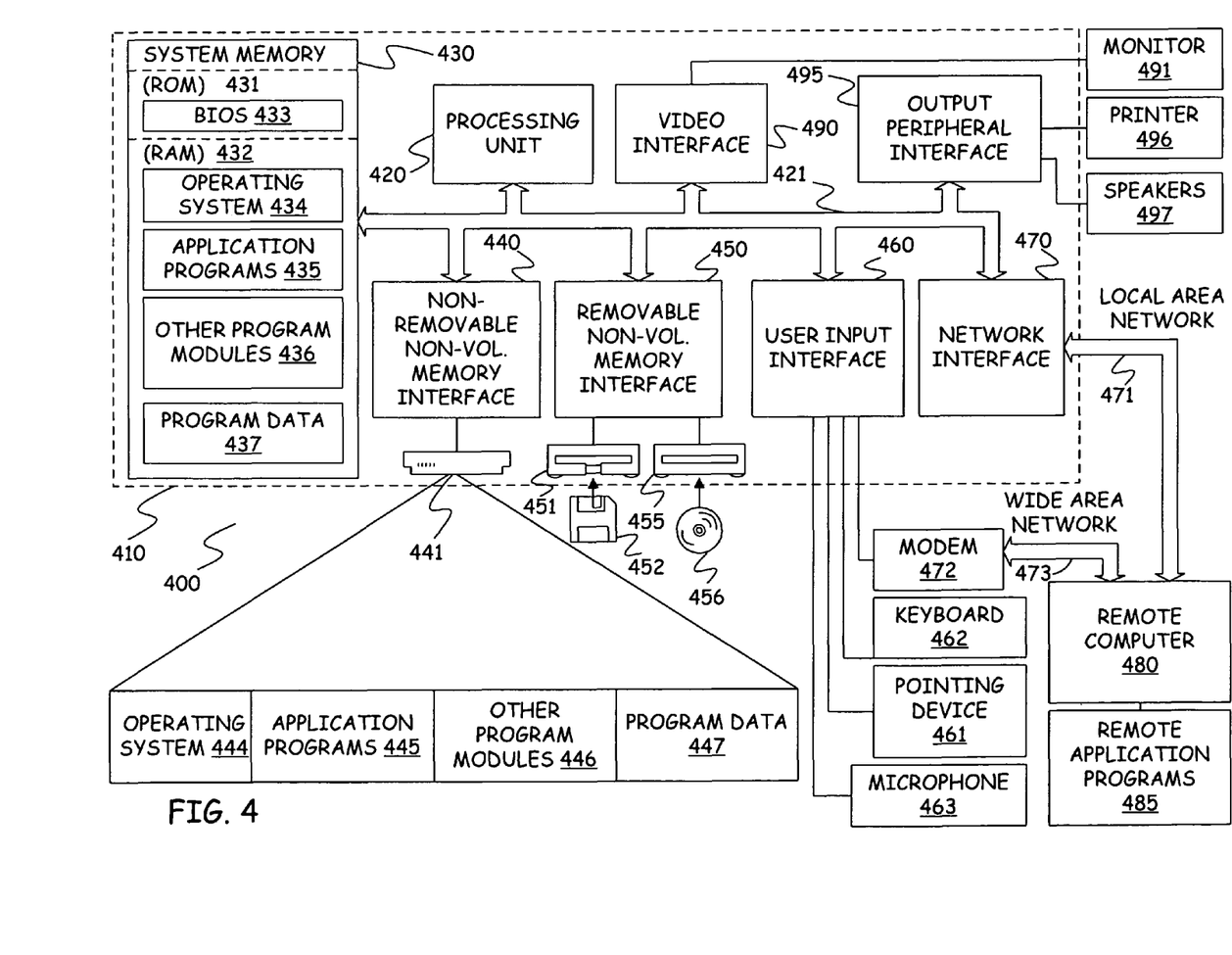
FIG. 4 is a block diagram that illustrates an example of a suitable computing system environment on which search engine embodiments may be implemented.

FIG. 4 illustrates an example of a suitable computing system environment 400 on which above-described search engine embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400. Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, televisions, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. Still other input devices (not shown) can include non-human sensors for temperature, pressure, humidity, vibration, rotation, etc. These and other input devices are often connected to the processing unit 420 through a user input interface 460 that is coupled to the system bus, but may be connected by other interface and bus structures, such as a parallel port, game port or a USB. A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented multi-level search method comprising:
    performing a primary search by a processor of the computer, the primary search comprising:
        executing a query submitted by a user by carrying out a keyword search, on at least one network server, through a search engine index of pages; and
        returning primary search results;
    performing a secondary search by the processor of the computer, the secondary search comprising:
        identifying at least one third-party source of information based on the query to carry out information mining;
        automatically assessing a semantic interpretation of the query to determine an intent of the user that submitted the query;
        utilizing the identified at least one third-party source of information and the semantic interpretation of the query to derive secondary search results, the secondary search results comprising information mined from the third-party source based on the semantic interpretation of the query; and
        returning the secondary search results;
    displaying the primary search results in a first section of a user interface; and
    displaying the secondary search results in a second section of the user interface, the secondary search results comprising a focused summary based on the semantic interpretation of the query, the focused summary comprising information that is focused on terms that are popular and relevant to the query.

2. The method of claim 1 and further comprising utilizing at least one of the semantic interpretation of the query, the at least one third-party source of information and the secondary search results to alter the primary search results.

3. The method of claim 1 wherein the focused summary comprises sections of documents listed in the primary search results.

4. The method of claim 3 wherein each of the sections is highlighted and comprises hypertext that leads to the respective document listed in the primary search results that includes the section.

5. The method of claim 1 wherein, for a query with multiple keywords, automatically assessing a semantic interpretation of the query comprises:

segmenting the query into multiple terms;
carrying out separate term-level searches with each of the multiple terms; and
incorporating term-level search results in the assessment of the semantic interpretation.

6. The method of claim 1 and further comprising utilizing query logs to help derive the secondary search results.

7. The method of claim 6 and further comprising utilizing user click frequency for the derivation of secondary search results.

8. The method of claim 1 wherein the identified at least one third-party source of information is identified from within pre-selected third-party sources of information.

9. The method of claim 8 wherein one of the pre-selected third-party sources is a particular online encyclopedia.

10. The method of claim 9 wherein the secondary search results include a summary of information derived from the particular online encyclopedia.

11. The method of claim 9 wherein the secondary search results further comprise a link to an identified page of the particular online encyclopedia.

12. A computer-implemented search engine comprising:
    primary search components, stored on a computer storage medium and executed by a processor of the computer, configured to receive a submitted query from a user and to responsively conduct a keyword search based on the query on at least one network server through a search engine index of pages;
    secondary search components, stored on the computer storage medium and executed by the processor of the computer, configured to carry out a secondary search operation by:
        identifying at least one third-party source of information based on the query to carry out information mining;
        automatically assessing a semantic interpretation of the query to determine an intent of the user that submitted the query;
        utilizing the identified at least one third-party source of information and the semantic interpretation of the query to derive secondary search results, the secondary search results comprising information mined from the third-party source based on the semantic interpretation of the query; and
    a user interface configured to:
        display the primary search results in a first section of the user interface; and
        display the secondary search results in a second section of the user interface, the secondary search results comprising a focused summary based on the semantic interpretation of the query, the focused summary comprising information that is focused on terms that are popular and relevant to the query.

13. The search engine of claim 12 wherein the secondary search components comprise a matching component, and wherein, for a query with multiple keywords, the matching component configured to:
    segment the query into multiple terms;
    carry out separate term-level searches with each of the multiple terms; and
    utilize term-level search results to formulate the secondary search results.

14. The search engine of claim 12 wherein at least one of the secondary search result components is configured to utilize query logs to formulate the secondary search results.

* * * * *